United States Patent
Andre et al.

(10) Patent No.: US 9,132,864 B2
(45) Date of Patent: Sep. 15, 2015

(54) VEHICLE STRUCTURE INCLUDING A BATTERY

(75) Inventors: Gerald Andre, Amberieu en Bugey (FR); Laurent Martin, Peaugres (FR); Stephane Ginja, Amberieu en Bugey (FR); Jerome Grando, Vertrieu (FR); Hugues Cheron, Meximieux (FR); Yves Rebuel, Paris (FR)

(73) Assignee: Compagnie Plastic Omnium, Lyons (FR)

( * ) Notice: Subject to any disclaimer, the term of this patent is extended or adjusted under 35 U.S.C. 154(b) by 463 days.

(21) Appl. No.: 13/501,480

(22) PCT Filed: Oct. 12, 2010

(86) PCT No.: PCT/FR2010/052156
§ 371 (c)(1),
(2), (4) Date: Jul. 30, 2012

(87) PCT Pub. No.: WO2011/045524
PCT Pub. Date: Apr. 21, 2011

(65) Prior Publication Data
US 2012/0282507 A1 Nov. 8, 2012

(30) Foreign Application Priority Data
Oct. 12, 2009 (FR) .................................. 09 57126

(51) Int. Cl.
*H01M 2/10* (2006.01)
*B62D 25/20* (2006.01)
(Continued)

(52) U.S. Cl.
CPC . *B62D 25/20* (2013.01); *B60K 1/04* (2013.01); *B60L 3/0007* (2013.01); *B60L 11/1877* (2013.01); *B60L 11/1879* (2013.01);
(Continued)

(58) Field of Classification Search
CPC .......... H01M 2/1077; H01M 10/5016; H01M 2/1083
USPC ........................................................... 429/100
See application file for complete search history.

(56) References Cited

U.S. PATENT DOCUMENTS 4,365,681 A    12/1982  Singh
5,378,555 A *  1/1995   Waters et al. .................. 429/97
(Continued)

FOREIGN PATENT DOCUMENTS

| EP | 1088694 A2 | 4/2001 |
| EP | 2070754 A1 | 6/2009 |
| FR | 2890366 A1 | 3/2007 |
| SU | 1279899    | 12/1986 |

OTHER PUBLICATIONS

International Search Report from PCT/FR2010/052156 dated Feb. 1, 2011; Paul Westland.

*Primary Examiner* — Jane Rhee
(74) *Attorney, Agent, or Firm* — Jacox, Meckstroth & Jenkins

(57) ABSTRACT

A vehicle structure includes a longitudinal structural element at each of its side edges, at least two shells superposed in such a manner as to form a housing, each shell being connected to the structural elements; at least one battery component comprising an energy storage unit arranged in the housing; and at least one fastener element connecting a shell to a member situated in the housing or to the other shell, the fastener element(s) being arranged in such a manner that the or at least one battery component is in compression in the shell-superposition direction, essentially corresponding to the vertical direction.

14 Claims, 3 Drawing Sheets

(51) Int. Cl.
 *B60K 1/04* (2006.01)
 *B60L 3/00* (2006.01)
 *B60L 11/18* (2006.01)
 *H01M 10/625* (2014.01)

(52) U.S. Cl.
 CPC ...... *B60K2001/0438* (2013.01); *H01M 2/1077* (2013.01); *H01M 2/1083* (2013.01); *H01M 10/5016* (2013.01); *Y02T 10/7005* (2013.01); *Y02T 10/705* (2013.01)

(56) References Cited

U.S. PATENT DOCUMENTS

| | | |
|---|---|---|
| 6,431,300 B1 | 8/2002 | Iwase |
| 7,610,978 B2 | 11/2009 | Takasaki et al. |
| 8,079,435 B2 | 12/2011 | Takasaki et al. |
| 2009/0152034 A1 | 6/2009 | Takasaki et al. |
| 2009/0239136 A1* | 9/2009 | Nagamine et al. ............ 429/148 |
| 2009/0242299 A1 | 10/2009 | Takasaki et al. |

* cited by examiner

VEHICLE STRUCTURE INCLUDING A BATTERY

FIELD OF THE INVENTION

The present invention relates to a vehicle structure, in particular for a motor vehicle having an electric motor for propulsion, either an electric vehicle or a hybrid vehicle, and preferably having considerable range.

BACKGROUND

Motor vehicles are known in the prior art that comprise a body in white made up in its bottom portion of longitudinal structural elements and transverse structural elements. These elements are more particularly closed metal section members and they extend respectively in the longitudinal direction of the vehicle or in its transverse direction. The longitudinal structural elements may extend between the front and rear axles of the vehicle, in which case they are referred to as "underbodies" in this application (even though they are also referred to as "side rails" by other specialists in the field). They may also be situated in front of or behind these axles, in which case they are referred to as "side rails" in this application (even though they are also referred to as "longitudinal members" by other specialists in the field). The transverse structural elements are referred to as "cross-members" in this application.

More particularly a motor vehicle is known, in particular from patent FR 2 890 366, that comprises a floor made up of two superposed portions, the floor incorporating a vehicle electric battery arranged between the two portions of the floor. The floor is put into place in such a manner as to be connected to the longitudinal and transverse structural elements of the body in white of the vehicle.

Such a floor is appropriate for vehicles that possess a battery of relatively small capacity, e.g. for hybrid vehicles that include both an engine and an electric motor for providing propulsion. Nevertheless, when the capacity of the battery increases, thereby increasing its volume, the prior art architecture requires the cross-members of the vehicle to be raised and the structural elements to be redimensioned, or even additional structural elements to be provided, in order to reinforce the bottom portion of the body and prevent the battery from being damaged in the event of an impact involving the vehicle.

Such a vehicle architecture is also disadvantageous in that it increases the weight of the vehicle, while reducing the space available inside the vehicle cabin.

SUMMARY

An object of the invention is to remedy the above-mentioned drawbacks by proposing a vehicle architecture that is adapted to batteries of greater capacity.

To this end, the invention provides a vehicle structure comprising a longitudinal structural element at each of its side edges, and also comprising:
- at least two essentially horizontal shells that are superposed so as to form a housing between them, each of the shells being connected to at least one of the two longitudinal structural elements;
- at least one battery component containing at least one energy storage unit arranged in the housing; and
- at least one fastener element connecting a shell to a member situated in the housing and/or to the other shell, the fastener element(s) being arranged in such a manner that the or at least one of the battery components is in compression in the shell-superposition direction, corresponding essentially to the vertical direction.

Because the fastener elements enable the battery components to be put into compression between the shells, the shell assembly is made more rigid, and the behavior of the battery components in response to an impact is improved.

As a general rule, the components comprise a casing serving to protect the energy storage units against external aggression, those casings possessing a certain amount of rigidity that serves to increase the contribution to the structure of the vehicle made by the assembly comprising the shells and the components. In addition, in the event of an impact, the components, on being compressed, take up a fraction of the forces due to the impacts. Since the impact is handled in part by these components, which then constitute functional elements as has not been the case in the prior art for such components, it is possible to omit having certain cross-members making up the body in white of the vehicle. The rigidity of the vehicle in certain regions of the bottom portion thereof may indeed be provided by the longitudinal elements and by the shell assembly.

Because of the absence of cross-members in the regions occupied by the shells, the shells may be of dimensions that are suitable for storing a battery system of large capacity, made up of the components, but without reducing the space available inside the vehicle cabin compared with prior art vehicles.

The vehicle structure of the invention is thus suitable for forming a hybrid vehicle or an electric vehicle having a large-capacity battery and presenting architecture that is relatively lightweight, compact, and good for withstanding impacts.

The structure is preferably suitable for withstanding the force due to an impact at high speed, i.e. an impact that occurs at a speed of more than 15 kilometers per hour (km/h). The term "withstanding the force due to an impact" is used to mean that the shell assembly including its components and fastener elements is suitable for receiving more than 20% of the maximum total dynamic force received by the vehicle.

The vehicle structure of the invention may also comprise one or more of the characteristics in the following list:
- each shell comprises a plurality of transverse ends extending in a direction that is essentially horizontal (or perpendicular to the direction in which the shells are superposed), and each component is situated at a distance from a given transverse end of the shell, preferably at a distance of more than 2 centimeters (cm), and in particular of 5 cm. More particularly, the or each of the components is arranged to be situated at a distance from the lateral ends of each shell, suitable for being adjacent to the longitudinal structural elements. Because of the "guard" distance that is retained between the components forming the battery system and the ends of the shells, the battery components, which are expensive, can remain intact even in the event of the vehicle suffering an impact. The end portions of the shells are capable of absorbing the energy associated with the impact by deforming, but without that causing other elements of the vehicle to come into contact with the battery components as a result of such an impact;
- the or at least one component is in compression between a shell and a member connected to the other shell. In particular, the or at least one fastener element bears against the or at least one component or is connected to an attachment member bearing against the or at least one component. The fastener elements may then include a projection such as a plate or a shoulder that bears against a battery component or against two adjacent battery components. The fastener element may then pass through the or at least one of the components;

both of the shells are connected together at all of their transverse ends, directly or with the help of at least one intermediate element, such that the housing constitutes a closed cavity, preferably with an interposed gasket such that the housing forms a leaktight cavity. This improves the protection provided to the battery component and to the occupants relative to the battery components;

the assembly made up of the shells and optionally the intermediate element(s) constitutes a single-piece part suitable for being fitted in one operation relative to the longitudinal structural elements, in particular between the longitudinal elements or beneath them. The assembly thus constitutes a self-supporting module that is independent and that can be assembled away from the main vehicle assembly line. This is advantageous when assembling the vehicle since costs can be reduced and it is also advantageous during the lifetime of the vehicle, since the part having the battery component can be removed and replaced for maintenance purposes without the necessity to disassemble the body in white of the vehicle. In spite of its potentially large dimensions, such a part deforms slightly, since it is held together in its central portion by the fastener elements. It should be observed that parts may be fitted between the longitudinal elements in the form of modules, each module being constituted by a plurality of assembled-together parts forming sub-modules of smaller size, in particular of smaller transverse size, there being for example one to five modules. Such a module is easier to handle than a large part, and parts of smaller dimensions also enable the range that is imparted to the vehicle to be varied (thereby varying its cost). Each of these parts may comprise two shells of smaller size, containing battery components in compression between them as a result of fastener elements and they are connected to a single longitudinal element of the vehicle;

at least one shell is shaped at at least one of its transverse ends to absorb the energy due to a high-speed impact, i.e. an impact taking place at more than 15 km/h. The term "absorb the energy due to the impact" is used to mean that the shell is suitable for absorbing at least 20% of the energy due to such an impact. The end is preferably the or one of the ends situated at a distance from each of the components. By means of such shapes, the end zone of the shell deforms and is more effective in absorbing impacts, thereby enabling the minimum distance between the components and the ends of the shell to be reduced, and thus reducing the overall size of the shells for a battery of given capacity. By way of example, each shell may comprise a hollow body, with corrugations or concertina-shapes making crumpling or buckling possible for the shell over a portion of its length, in the vicinity of its end. It may also include "fuse" zones or programmed deformation zones, such as folding zones;

the fastener element(s) is/are arranged to be at a distance from a given transverse end of at least one shell, preferably the end that is also situated at a distance from the component, thereby enabling it to deform better and to absorb energy more effectively;

at least one of the two shells and possibly the or one of the intermediate elements is/are provided with energy absorber means in the vicinity of at least one of the transverse ends of the shell. Such energy absorber means may comprise a foam absorber or a thermoplastic absorber, e.g. having ribs, in particular in a honeycomb configuration. Such means may be placed in the housing formed by the shells, or more preferably, in order to avoid damaging battery components with the energy absorber means in the event of an impact, outside the housing, between the shell or the intermediate part and the adjacent longitudinal structural element. Such means also serve to reduce the risk of damaging battery components as a result of the vehicle suffering an impact;

resilient means are arranged between the or at least one component and at least one of the shells so as to exert a return force on the component. The fastener element may then form positioning means, e.g. centering and/or holding means for the resilient means serving to keep them in place throughout the lifetime of the vehicle. The return force of the resilient means may also be exerted on the component by an intermediate element bearing against the battery component, such as the fastener element. Such resilient means, e.g. formed by a spring or a spring washer, forms an element for taking up slack, enabling contact and force transmission to take place between the shells and the components in spite of dispersion amongst the dimensions of the components and/or of the shells associated in particular with drift in the manufacture thereof. Such means thus make it possible to ensure that forces are transmitted from the shells to the casing of a battery component, in particular in the event of an impact, even if, under such circumstances, the washer becomes fully compressed as a result of the plate buckling, thereby ensuring a better distribution of forces on the casing of the component, which component may be stressed only in the vicinity of the fastener element. The resilient means may also form the attachment member against which the fastener element bears;

at least one of the components has attachment means for engaging an adjacent component, the attachment means comprising in particular a shape that is suitable for providing mechanical attachment with a complementary shape of an adjacent component, e.g. by snap fastening. This enables the components to be better positioned relative to the shells and to one another;

at least one of the shells includes means for positioning the or at least one of the components relative thereto, thus making it possible to avoid the components coming closer to the end of the shells as a result of a disturbance, such as a small impact;

the top shell forms a floor of the vehicle or forms a support for a floor of the vehicle. Under such circumstances, such a shell may be suitable for supporting seats, and fastenings for safety belts;

at least one of the shells includes at least one additional functional element, such as electrical connection means enabling the components to be electrically connected to one another or enabling them to be connected to elements external to the housing, such as the electric motor. Air flow means may also be provided in the housing, with at least one of the shells possibly being shaped so as to form such means. Such air flow means, situated in the vicinity of the battery component(s) enable the battery component(s) to be cooled and serve to avoid overheating;

at least one of the shells is made at least in part out of an electrically conductive material and preferably includes a layer of electrically conductive material over essentially its entire surface. By way of example, an electrically conductive material is a metal material arranged in the shell, in particular in the form of a plate or a grid, where the metal may for example be aluminum or steel. The or at least one of the intermediate element(s) may also be made at least in part out of an electrically conductive material. A shell made at least in part out of such a material makes it possible to obtain Faraday cage type behavior, thereby attenuating the emission of electromagnetic waves as a result of the operation of components situated inside the housing (battery, connections, electronics), so as to avoid disturbing other electrical or electronic equipment of the vehicle and also to avoid subjecting the occupants of the vehicle to an excessive flux of electromagnetic waves that is potentially dangerous for their health. Similarly, this also serves to protect the electrical or electronic components situated inside the housing from electromagnetic waves coming from the other parts of the vehicle. A metal shell also enables good rigidity to be imparted to the shells together with the ability to withstand impacts. Furthermore, the shell (s), when made of metal, may serve as thermal conduction means for cooling or preheating the battery component;

the housing situated between the two shells presents a thickness lying in the range 100 millimeters (mm) to 400 mm in the shell-superposition direction, thus enabling a battery of desired capacity to be installed without thereby exceeding the conventional height for longitudinal structural elements. This therefore makes it possible to minimize the size of the vehicle.

The invention also provides a vehicle part for connecting to at least one structural element of a vehicle body in white and situated at a side edge of the part, the part comprising:

at least two shells superposed so as to form a housing between them;

at least one battery component comprising at least one energy storage unit arranged in the housing; and at least one fastener element connecting a shell to a member situated in the housing or to the other shell, the fastener element(s) being arranged in such a manner that the or at least one battery component is in compression in the shell superposition direction.

In particular, each part extends over all or a portion of the dimension of the body in white between the longitudinal structural elements situated at the respective side edges of the body in white.

Such a part is totally independent of the vehicle body and can be manufactured away from the main vehicle assembly line, and then this part or a plurality of parts preassembled to form a module may subsequently be fitted to the vehicle body between the longitudinal structural elements.

The part of the invention may also include one or more of the characteristics mentioned above.

BRIEF DESCRIPTION OF THE DRAWINGS

The invention can be better understood on reading the following description given purely by way of example and made with reference to the drawings, in which.

DETAILED DESCRIPTION

Figure 1:
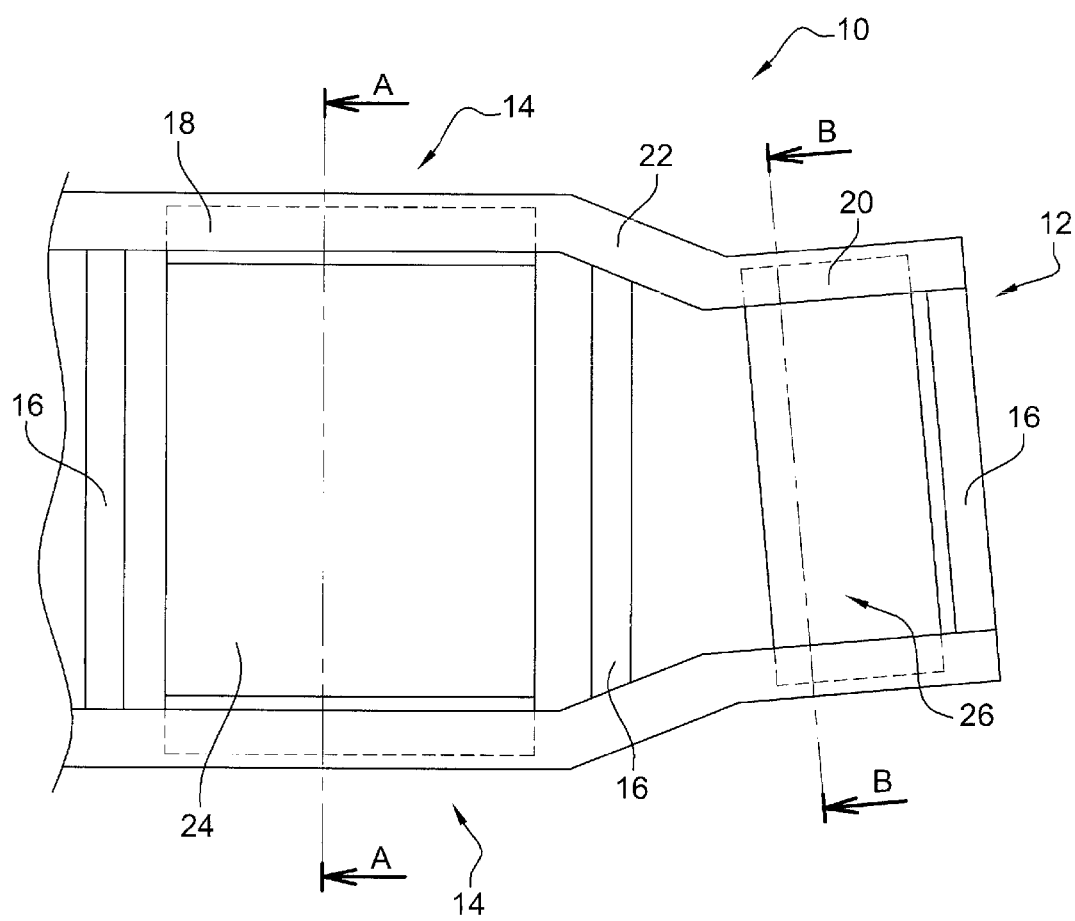
FIG. 1 is a plan view of a bottom portion of a vehicle in a particular embodiment of the invention.

The figures show a bottom portion of a motor vehicle structure 10, also known as a "sub-frame", where such a structure serves to withstand the mechanical stresses to which the vehicle is subjected and to carry the bodywork 13 of the vehicle. The structure comprises the vehicle body 12 having two longitudinal elements 14 extending along each side of the vehicle. It also has cross-members 16 extending between the longitudinal elements 14.

Each longitudinal element has a first portion extending between the axles of the vehicle and forming the underbodies 18, a portion extending behind the rear axle and forming side rails 20, which portion is raised relative to the underbodies 18, and a connection portion 22 over the axle. These elements 18-22 are generally made using stamped metal section members, in particular members made of sheet metal.

The cross-members 16 are situated at the front end of the underbodies 18, level with the rear axle, between the connection portions 22, and at the rear end of the vehicle, between the side rails 20.

As can also be seen in FIG. 1, the body has a large amount of space, more than 50 cm and preferably 1 meter (m) between two consecutive cross-members. Modules 24 and 26 are arranged in the spaces left between the cross-members. The module 24 is situated more particularly between the underbodies 18, and the part 26 is situated under the side rails 20. These modules are formed by respective single parts that are assembled away from the assembly line, and they are described in greater detail in FIGS. 2 to 5, these parts forming integral portions of the vehicle structure since they withstand a fraction of the stresses to which the vehicle is subjected.

Figure 2:
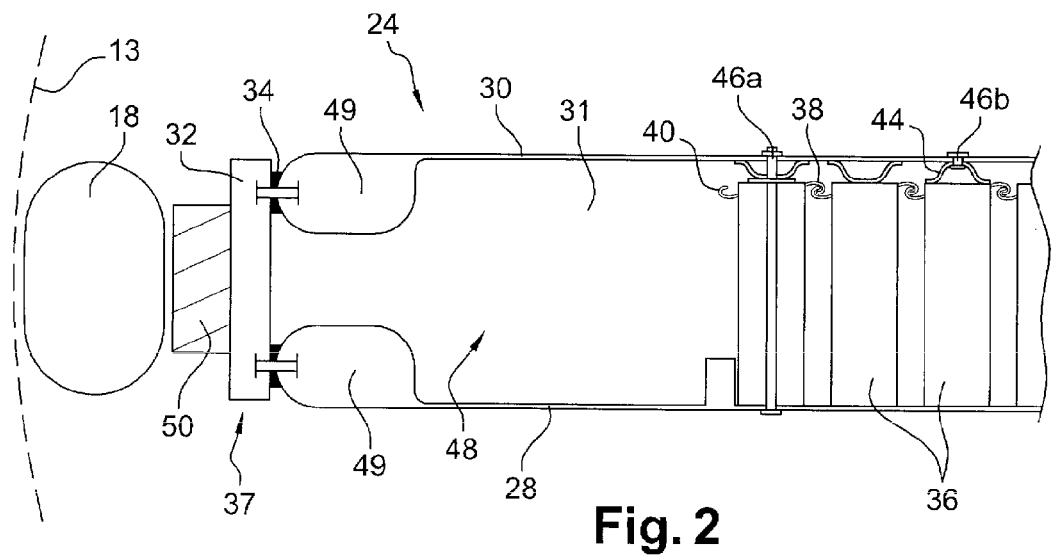
FIG. 2 is a cross-section view of the FIG. 1 vehicle on A-A, showing a part in a first embodiment of the invention.
Figure 3:
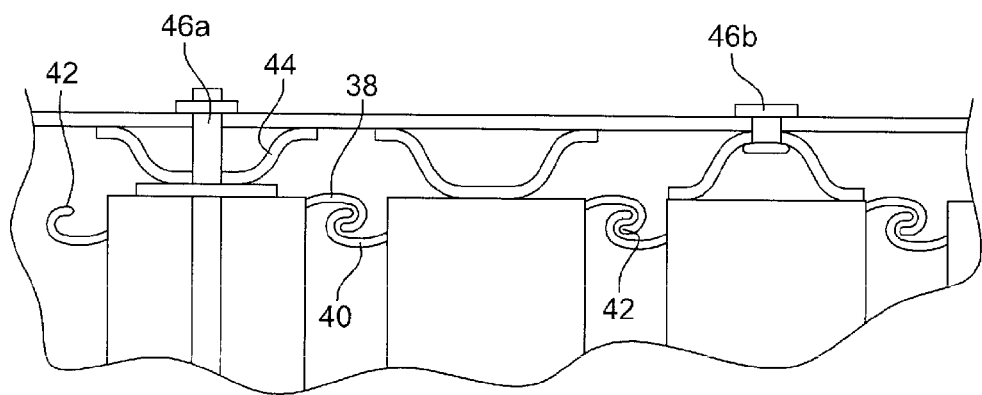
FIG. 3 is a detail view of the FIG. 2 part.
Figure 4:
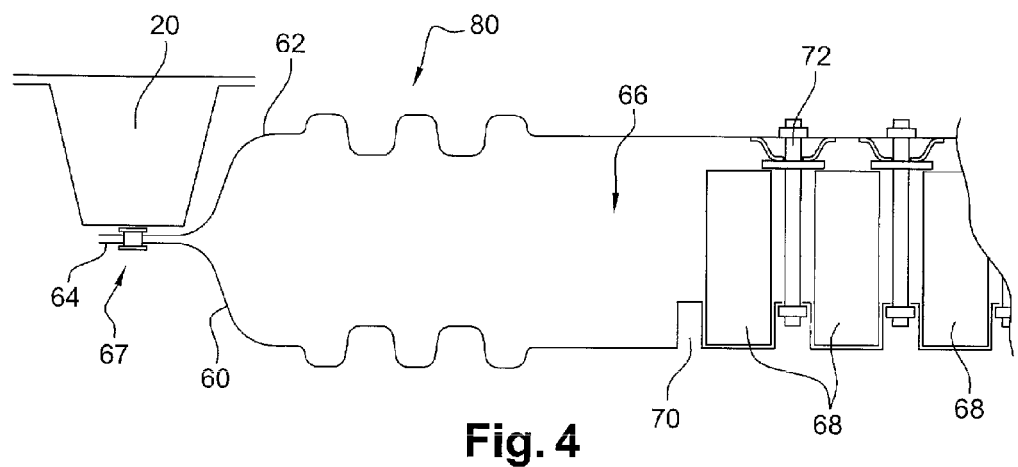
FIG. 4 is a cross-section view of the FIG. 1 vehicle on B-B showing a part in a second embodiment of the invention.
Figure 5:
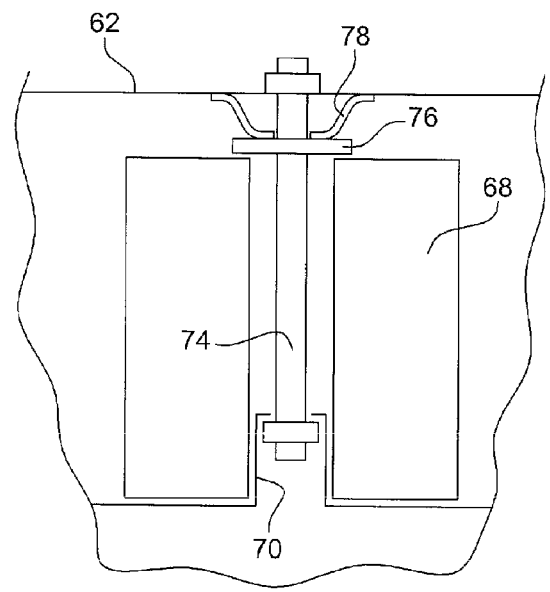
FIG. 5 is a detail view of the FIG. 2 part.

The description begins with a first module-forming part 24 arranged between the underbodies of the FIG. 1 vehicle, this description being with reference to FIGS. 2 and 3.

In FIG. 2, it can be seen that the part 24 comprises a first or bottom shell 28 and a second or top shell 30, the bottom and top shells being essentially horizontal and superposed in the vertical direction. The shells 28 and 30 are essentially plane in shape and they are made of metal, in particular of aluminum, using a folded sheet such that each shell has two superposed walls. The shells 28, 30 are dimensioned to be put into place in the spacing between the underbodies of the vehicle, and in particular each of them has a size that is substantially identical to the distance between the underbodies.

The shells are also assembled so as to define a housing 31 situated between them, which housing is preferably of a thickness lying in the range 100 mm to 400 mm. For this purpose, the shells are connected together at each of their transverse ends (i.e. ends in a direction perpendicular to the direction in which the shells are superposed, i.e. their ends that extend essentially in the horizontal direction when the part is mounted on a vehicle) by means of an intermediate element 32 forming a peripheral frame of a size suitable for surrounding each of the shells. The shells are more particularly connected to the frame 32 by screws with an interposed gasket 34. The housing 31 thus forms a cavity that is closed and preferably leaktight.

The part made up of the shells, of the intermediate element, and of the elements contained in the housing is a single piece and it is fitted in a single operation between the underbodies 18 of the vehicle. It may thus be fabricated away from the vehicle assembly line, thereby serving to limit the space occupied beside the assembly line, to limit manipulation, and thus to achieve savings in manufacturing costs.

This part includes battery components 36 arranged in the housing 31. The battery components 36 comprise at least one energy storage unit, each unit comprising an anode and a cathode installed in a medium that serves to conduct ions, such as a gel. By way of example, each energy storage unit may be insulated from the outside by a leakproof film of plastics material. The battery components 36 having one or more energy storage units also includes a rigid casing made of a metal or plastics material that surrounds the energy storage units and that protects them from external aggression.

These components 36 taken together form a battery system for powering an electric motor of the vehicle and they are electrically interconnected by connection elements (not shown in the figures) that are preferably situated on the faces of the two shells that face towards the inside of the housing. Such a part 24 may be shaped in particular so as to have only one element for connection to the electrical system of the vehicle, which connection is situated outside the housing 31, while the other electrical connections are situated inside the housing and cannot be reached from outside it, such that the electrical operation of the batteries remains deliberately inaccessible to the user of the vehicle, or even to a garage.

The components 36 are arranged in the central portion of the shells 28 and 30 at a distance that is greater than a predetermined distance from the lateral ends 37 of each of the shells extending beside the underbodies 18. The predetermined distance is not less than 2 cm, and in this example it is about 5 cm.

Each component 36 is placed on the bottom shell 28 and is assembled to an adjacent component by attachment means situated on each of the components. In this example these means are constituted by complementary shapes situated on faces facing the components. On one of its faces, the component has a resilient longitudinal tongue 38 formed integrally with the casing, being in the shape of a hook with a free end that faces upwards. On the opposite face of the component, it also has a hook-shaped resilient longitudinal tongue 40 with a free end facing downwards. The two tongues are arranged on the component in such a manner that a tongue of a given component and the opposite tongue of the adjacent component can co-operate. Each tongue also includes a lug 42 at its free end so as to prevent the tongues from coming apart once they have been assembled together. Once the components have been assembled together by means of the attachment means they can thus be held stationary more easily between the shells, because of their inertia.

As can be seen in FIG. 3, space also remains between each component and the top shell 30. An attachment member 44 is interposed between some of the components 36 and the top shell. This member forms resilient means, here having the shape of a washer, and it is made of a plastics material. It bears against the shell 30 and against the battery component 36 or against an element bearing against said component, e.g. a fastener element 46 as described below, so as to be somewhat deformed elastically and therefore exert a return force on the component. It forms a clearance takeup element enabling the components to be in contact with the top shell in spite of the components presenting dimensional dispersions.

The part also has fastener elements 46 connecting the top shell 30 to the bottom shell 28, or connecting one of the shells, here the top shell 30, to an element situated inside the housing.

The first fastener element 46a more particularly attaches the top shell 30 to the bottom shell 28. It comprises a fastener body 45a passing through the component 36 and the washer 44, and also the two shells 28 and 30. It also includes a plate 47a situated at the top of the body, bearing against the top end of the component having the body passing therethrough. The washer 44 is arranged on the fastener body so as to be in contact with the shell 30 and the plate 47a of the fastener element, thereby enabling force to be transferred from the shell towards the component. The fastener element 46a thus enables the spring washer 44 to be properly positioned.

The element 46a is also threaded at each of its ends and it is connected in each portion of the body projecting from the shells to a nut that is in contact with the outwardly-facing face of each of the shells 28, 30.

The second fastener element 46b connects the washer 44 pressing against the component to the top shell 32. This fastening is screw fastening and may be implemented using a conventional nut-and-bolt system. The washer 44 bearing against the component 36 and exerting a return force thereon suffices to compress slightly the component between the two shells and to transfer a fraction of the forces on the top shell to the component.

The fastener elements 46a, 46b facilitate taking up the forces acting on the part in the event of an impact, and they also serve to increase the rigidity of the part, which makes it possible to avoid damaging it while it is being handled, and to increase its structural contribution of the vehicle, thereby avoiding the need to add additional compensation cross-members to the body in white of the vehicle, which would make it heavier.

The fastener elements 46a, 46b are also situated in the central portion of the shells, remote from the lateral ends of the shells.

The housing also includes at each of its lateral ends a zone 48 that does not have any fastener elements or any component 36. This zone is used for absorbing high-speed impacts. For this purpose, and in its portion defining this zone, each shell includes shapes that make it easier for it to absorb such impacts. Each shell includes more particularly a hollow body 49 extending at each of its lateral ends. Such a hollow body serves to increase the rigidity at the ends of the shells and also enables them to absorb more energy when they deform in the event of such an impact.

In order to absorb even more energy during an impact, the part includes an absorber 50 formed by a block of foam and arranged on the outside structure of the intermediate element 32 closing the housing 31 in the vicinity of each of the lateral ends of the shells, such that the absorber is arranged between the underbody 18 and the intermediate part 32.

The part 24 is fabricated as follows: firstly, the battery components 36 in the form of blocks that have been preassembled with the help of the attachment means 38 and 40 are put into place on the bottom shell 28. The body 45a of the fastener element 46a is then put into place so that the plate 47a presses against the top end of the component 36, and a first nut is screwed onto the bottom end of the body against the bottom face of the bottom shell 28 so as to hold the plate 47a pressed against the component. Thereafter the frame 32 is assembled with the bottom shell 28, with a gasket 34 being interposed between them.

Thereafter the washer 44 is put into place on the body 45a of the element 46a and the washer 44 and the fastener screw 46b are also put into place, and then the top shell is positioned and the nuts are screwed on respectively at the top ends of the body 45a of the element 46a and of the screw 46b such that each nut comes into abutment against the top face of the top shell 30. When the top shell 30 is in place, the spring washers 44 are compressed so that they exert a return force on the component 36 or the fastener element 46a.

Thereafter the frame 32 is assembled to the top shell 30 with an interposed gasket so as to form a single piece comprising a leaktight housing, and this single piece is then assembled on the underbodies of the vehicle.

There follows a description of a part in a second embodiment of the invention, this being the part forming the module 26 situated at the rear of the vehicle in FIG. 1. Such a part also comprises a bottom shell 60 and a top shell 62, both of which are made of metal. Each of the shells has a peripheral portion 64 that is plane and a central portion extending in relief. The shells 60 and 62 are arranged in such a manner that the portions in relief face each other and form a housing 66 between the shells 60 and 62 when the peripheral portions 64 of the shells are in contact. The top shell 62 is more particularly oriented so that its portion in relief projects upwards while the bottom shell 60 is oriented so that its portion in relief forms a depression, once the two shells are assembled together.

The shells are interconnected via their peripheral portion by screw fastening with an interposed gasket so that the housing 66 forms a closed cavity. The shells are also dimensioned so as to be capable of being connected to the side rails, in particular by presenting a size that is substantially equal to the distance between the side rails. The part 26 may then also be fastened under the side rails 20 of the vehicle via the peripheral zone of the shells, by means of screw fastening.

The battery components 68 are also arranged in the housing 66. These components are of the kind described above. In order to place the components appropriately in the housing, the bottom shell 62 has projections 70 forming a frame defining setbacks for receiving each of the components, where such a frame constitutes means for positioning the battery components 68 relative to the shells and also forms a spacer between the components.

The module also has fastener elements 72 for fastening the bottom and top shells 60 and 62 to the components. Each fastener element comprises a fastener body 74 forming a rod passing through the housing between the two components and inserted in superposed orifices in the top and bottom shells 60 and 62. The orifice in the bottom shell is more particularly arranged in a projection 70.

Each fastener element has a plate 76 at the top portion of its body, which plate bears against the top ends of two adjacent components 68 on either side of the projection 70. The body of the fastener element 72 is also threaded at its top end and at its bottom end and it is connected in each of its portions projecting from the shells to a respective nut in contact with the outwardly-facing faces of the shells 60, 62. These elements 72 also serve to transfer forces resulting from impacts of the shells against the components.

The part also includes a resilient element 78 in the form of a washer placed at the top end of the fastener element between the plate 76 of the fastener element and the top shell 62 so as to be in contact with the top shell and with the plate, and so as to exert a return force on the plate, and thereby on the components 68.

Each component 68 is situated at a distance greater than a predetermined distance from the side end 67 of each of the shells. The predetermined distance is greater than 5 cm. The fastener elements 72 as described are also situated at a distance that is greater than the predetermined distance from each of the transverse ends of the shells.

The housing 66 thus includes a marginal zone of the housing without any components or fastener elements. This zone is designed to deform while absorbing a high-speed impact. For this purpose, each shell comprises corrugations 80 in its portion defining its marginal zone, thereby enabling the shell to deform in programmed manner. The shell deforms by crumpling, which corresponds to the shell buckling over a fraction only of its length at its lateral ends, as a result of the corrugations that it presents. Deformation of that kind is good for absorbing energy.

Parts such as those described above are most advantageous since they enable batteries of very large capacity to be put into place for hybrid or electric vehicles while using a structure that provides good ability to withstand impacts and that is light in weight.

The part may also include means for guiding air in the vicinity of the components so as to enable them to be cooled or so as to cool other functional elements that are not shown in the figures.

It should also be observed that the invention is not limited to that described above.

By way of example, the vehicle structure may comprise a plurality of parts making up smaller sub-modules, in particular of transverse dimensions that are smaller than those described above. Thus, each part made up of superposed shells is assembled to at least one other part from which it is independent, away from the assembly line so as to form a module of dimensions suitable for being connected to each of its longitudinal structural elements, and suitable for fitting to the vehicle body on a single occasion.

The vehicle may include one or more than two modules or sets of shells. Since each set of shells is independent, if a vehicle has more than one set of shells, it may have sets that are identical or different.

Furthermore, the shells need not form a module, and they may be put into place directly on longitudinal structural elements so as to be connected to those elements independently of each other. It should also be observed that the positioning of the cross-members and of the shells on the vehicle is not limited to the positioning described above.

Each set of shells could also have a single battery component comprising a large number of energy storage units. In contrast, each component could comprise a single energy storage unit, with a large number of components then being arranged in the housing.

The fastener elements are likewise not limited to the above description. They may be of some other shape. It is also possible to envisage fastener means other than screw fastener means. Certain fastener elements may also be situated closer to the transverse ends of the shells than those described.

It should also be observed that the components and the fastener elements may be remote from each end in the longitudinal and lateral directions of the shells, or in only one of those directions, depending on the risks of those ends being damaged during a high-speed impact. For example, when the shells are situated in the rear portion of the vehicle, their rear ends may be provided with impact absorber means.

The set of shells may likewise be lacking in resilient means. In addition, these resilient means may also be means other than those described. For example, the resilient means may comprise a spring arranged around a fastener element.

The zone situated at the margin of the shells that does not include components and fastener elements may also have fastener elements passing therethrough and/or need not be shaped as in the examples. The shell may merely have a wall that is plane in this location. It may also include other shapes for programming deformation of the shells. In addition, additional energy absorber means may be situated in the housing instead of or as well as elements situated at the outside thereof. The energy absorber means are not limited to a block of foam. They may be constituted by a network of ribs of thermoplastic material.

The means for positioning the components relative to the shell are likewise optional. The means for attaching the components are also optional and they may be shaped other than as described. The components may also include means for attaching to other components situated on their faces that are not shown in the figures. The positioning and attachment means may also be combined.

The shell assembly may also form a support for the floor of the vehicle. It may then be suitable for taking up the forces due to the fastening points for seat belts on the floor.

The materials used for the various elements of the vehicle may also be different from the above description. Similarly, the shapes of the various elements are not limited to the shapes described. For example, it is possible to envisage that two battery components are superposed inside the housing, in the superposition direction.

The invention claimed is:

1. A vehicle structure comprising:
    a longitudinal structural element at each of its side edges;
    at least two essentially horizontal shells that are superposed so as to form a housing between them, each of said at least two essentially horizontal shells being connected to at least one of the two longitudinal structural elements;
    at least one battery component containing at least one energy storage unit arranged in said housing; and
    at least one fastener element comprising a fastener body, a resilient means and a plate, wherein said fastener body passes through said at least two essentially horizontal shells, said resilient means and said plate, wherein said plate bears against said at least one battery component and said resilient means bears against said plate and at least one of said at least two essentially horizontal shells so as to exert a compressive force on said at least one battery component, said at least one fastener element securing said at least two essentially horizontal shells together and being arranged in such a manner that said at least one battery component is in compression in the shell-superposition direction, corresponding to a vertical direction, wherein at least one of said at least one fastener element is situated between adjacent energy storage units, wherein said resilient means is a spring washer;
    a portion or surface of one of said at least two essentially horizontal shells being generally parallel to a portion or surface of the other of said at least two essentially horizontal shells with said at least one battery component being situated therebetween;
    said at least one fastener comprising a fastener body that passes through and is in contact with said portions or surfaces of said at least two essentially horizontal shells so that when said at least one fastener element is tightened, said at least two essentially horizontal shells become fastened together and a force is transferred to a member which applies a compressive force to said at least one battery component.

2. The vehicle structure according to claim 1, wherein a second battery component containing at least one energy storage unit is arranged in said housing and is in compression between one of said at least two essentially horizontal shells and a resilient means connected to the other one of said at least two essentially horizontal shells so as to exert a return force on said second battery component.

3. The vehicle structure according to claim 1, wherein each of said at least two essentially horizontal shells has a plurality of transverse ends extending in an essentially horizontal direction, and each of said at least one battery component is situated at a distance from a given transverse end of said at least two essentially horizontal shells, preferably a distance that is greater than 2 cm, in particular 5 cm.

4. The vehicle structure according to claim 1, wherein both of said at least two essentially horizontal shells are also connected together at their transverse ends, directly or with the help of at least one intermediate element, such that said housing forms a closed cavity, preferably with an interposed gasket such that the cavity is leaktight.

5. The vehicle structure according to claim 4, wherein the assembly formed by said at least two essentially horizontal shells and optionally by the at least one intermediate element constitutes a single-piece part suitable for being fitted in one operation relative to the longitudinal structural element(s).

6. The vehicle structure according to claim 1, wherein at least one of said at least two essentially horizontal shells is shaped at at least one of its transverse ends to absorb the energy due to an impact of the high-speed type, said transverse end being constituted in particular by one of said transverse ends situated at a distance from said at least one battery component, said at least one of said at least two essentially horizontal shells preferably including a hollow body or corrugations in the vicinity of said transverse end.

7. The vehicle structure according to claim 1, wherein at least one of said at least two essentially horizontal shells and possibly at least one intermediate element is/are provided with energy absorber means in the vicinity of at least one transverse end of at least one of said at least two essentially horizontal shells.

8. The vehicle structure according to claim 1, wherein at least one of said at least two essentially horizontal shells is made at least in part out of an electrically conductive material, such as a metal material, and includes in particular at least one metal layer over essentially its entire surface.

9. The vehicle structure according to claim 1, wherein air flow means are arranged in said housing, preferably at least one of said at least two essentially horizontal shells is shaped to form such air flow means.

10. A vehicle part for connecting to at least one longitudinal structural element of a vehicle body and situated at a side edge of the vehicle part, the vehicle part comprising:
    at least two shells superposed so as to form a housing between them;
    at least one battery component comprising at least one energy storage unit arranged in said housing; and
    at least one fastener element comprising a fastener body, a washer, a plate and two nuts, wherein said fastener body passes through said at least two shells, said washer and said plate, wherein said plate bears against said at least one battery component, wherein said washer bears against said plate and one of said at least two shells so as to exert a compressive force on said at least one battery component, wherein said fastener body comprises two threaded ends projecting from said at least two shells wherein each nut mounted on the threaded end is in contact with the outwardly-facing face of said at least two shells, said at least one fastener element being arranged in such a manner that said at least one battery component is in compression in a superposition direction, wherein at least one of said at least one fastener element passes through said at least one battery component, wherein said washer is a spring;
    a portion or surface of one of said at least two shells being generally parallel to a portion or surface of the other of said at least two shells with said at least one battery component being situated therebetween;
    said at least one fastener element comprising a fastener body that passes through and is in contact with said portions or surfaces of said at least two shells so that when said at least one fastener element is tightened, said at least two shells become fastened together and a force is transferred to a spring member which applies a compressive force to said at least one battery component.

11. The vehicle structure according to claim 1, wherein said at least one fastener element comprises a nut and a bolt.

12. The vehicle structure according to claim 1, wherein said at least one fastener element is remote from the lateral ends of said at least two essentially horizontal shells.

13. The vehicle structure according to claim 1, wherein said fastener body comprises two threaded ends projecting from said at least two essentially horizontal shells and wherein at least one nut is mounted on each threaded end.

14. The vehicle structure according to claim 13, wherein said at least one nut is in contact with the outwardly-facing face of said at least two essentially horizontal shells.

* * * * *